(12) United States Patent
Abedini et al.

(10) Patent No.: US 10,645,689 B2
(45) Date of Patent: May 5, 2020

(54) LINK ESTABLISHMENT IN A WIRELESS BACKHAUL NETWORK USING RADIO ACCESS TECHNOLOGY

(71) Applicant: QUALCOMM Incorporated, San Diego, CA (US)

(72) Inventors: Navid Abedini, Raritan, NJ (US); Karl Georg Hampel, New York, NY (US); Muhammad Nazmul Islam, Edison, NJ (US); Sundar Subramanian, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 15/392,911

(22) Filed: Dec. 28, 2016

(65) Prior Publication Data

US 2018/0049190 A1 Feb. 15, 2018

Related U.S. Application Data

(60) Provisional application No. 62/373,743, filed on Aug. 11, 2016.

(51) Int. Cl.
*H04W 72/04* (2009.01)
*H04W 56/00* (2009.01)
(Continued)

(52) U.S. Cl.
CPC ...... *H04W 72/0446* (2013.01); *H04B 7/0695* (2013.01); *H04L 1/0001* (2013.01);
(Continued)

(58) Field of Classification Search
CPC .............. H04W 72/0446; H04W 56/001
See application file for complete search history.

(56) References Cited

U.S. PATENT DOCUMENTS

2009/0323621 A1 12/2009 Touboul et al.
2010/0002637 A1 1/2010 Huoviala et al.
(Continued)

FOREIGN PATENT DOCUMENTS

EP 3190818 A1 7/2017
WO 2013111601 A1 8/2013
(Continued)

OTHER PUBLICATIONS

Partial International Search Report—PCT/US2017/041654—ISA/EPO—dated Sep. 28, 2017.
(Continued)

*Primary Examiner* — Hoon J Chung
(74) *Attorney, Agent, or Firm* — Arent Fox LLP

(57) ABSTRACT

A solution to enable synchronization and establishing links among the APs using available RATs with minimum modifications is provided. In one aspect, an apparatus may determine a first set of resources to be used for establishing network access for a set of UEs. The apparatus may determine a second set of resources for establishing backhaul links with a set of base stations. A resource schedule of the apparatus may include the first set of resources and the second set of resources. In another aspect, an apparatus may be a first base station. The first base station may receive a set of reports from a set of base stations. The first base station may determine a resource schedule for a second base station within the set of base stations based on the set of reports. The first base station may transmit the resource schedule to the second base station.

18 Claims, 10 Drawing Sheets

(51) Int. Cl.
| | |
|---|---|
| H04L 5/00 | (2006.01) |
| H04B 7/06 | (2006.01) |
| H04L 1/00 | (2006.01) |
| H04W 92/04 | (2009.01) |
| H04W 76/12 | (2018.01) |
| H04W 76/27 | (2018.01) |
| H04W 24/10 | (2009.01) |
| H04W 74/08 | (2009.01) |
| H04W 92/20 | (2009.01) |
| H04J 11/00 | (2006.01) |

(52) U.S. Cl.
CPC ............ *H04L 5/005* (2013.01); *H04L 5/0053* (2013.01); *H04W 24/10* (2013.01); *H04W 56/001* (2013.01); *H04W 56/0015* (2013.01); *H04W 74/0833* (2013.01); *H04W 76/12* (2018.02); *H04W 76/27* (2018.02); *H04W 92/04* (2013.01); *H04B 7/0684* (2013.01); *H04J 11/0069* (2013.01); *H04L 5/0092* (2013.01); *H04W 92/20* (2013.01)

(56) References Cited

U.S. PATENT DOCUMENTS

| | | | |
|---|---|---|---|
| 2010/0080139 A1* | 4/2010 | Palanki ................ | H04B 7/2606 370/252 |
| 2012/0002591 A1* | 1/2012 | Noh .................. | H04B 7/15557 370/315 |
| 2014/0099881 A1 | 4/2014 | Boudreau et al. | |
| 2016/0006498 A1 | 1/2016 | Chung et al. | |
| 2017/0222693 A1* | 8/2017 | Shen .................... | H04B 7/0408 |

FOREIGN PATENT DOCUMENTS

| | | |
|---|---|---|
| WO | 2014124164 A1 | 8/2014 |
| WO | 2015154599 A1 | 10/2015 |
| WO | 2016119200 A1 | 8/2016 |

OTHER PUBLICATIONS

Potevio: "UL Timing Synchronization for TDD Relay", 3GPP TSG RAN WG1 Meeting #61, R1-102992, May 4, 2010, XP050420098, 6 pages.

ZTE: "Scenarios and Specification Impact of Type 2 Relay", 3GPP TSG-RAN WG1#60 R1-100979, , Feb. 16, 2010, 7 Pages.

ZTE: "Synchronization in Backhaul Link", 3GPPTSG-RAN WG1 #59b, R1-100544, Jan. 12, 2010, XP050418172, 4 pages.

Huawei: "Support for Flexible Backhauling for 5G", 3GPP Draft; R1-162168, 3rd Generation Partnership Project (3GPP), Mobile Competence Centre; 650, Route Des Lucioles; F-06921 Sophia-Anti Polls Cedex; France, vol. RAN WG1, No. Busan, Korea; Apr. 2, 2016, XP051080014, Retrieved from the Internet: URL:http://www.3gpp.org/ftp/tsg_ran/WG1_RL1/TSGR1_84b/Docs/ [retrieved on Apr. 2, 2016], 4 pages.

International Search Report and Written Opinion—PCT/US2017/041654—ISA/EPO—dated Nov. 30, 2017.

* cited by examiner

LINK ESTABLISHMENT IN A WIRELESS BACKHAUL NETWORK USING RADIO ACCESS TECHNOLOGY

CROSS-REFERENCE TO RELATED APPLICATION(S)

This application claims the benefit of U.S. Provisional Application Ser. No. 62/373,743, entitled "LINK ESTABLISHMENT IN A WIRELESS BACKHAUL NETWORK USING RADIO ACCESS TECHNOLOGY" and filed on Aug. 11, 2016, which is expressly incorporated by reference herein in its entirety.

BACKGROUND

Field

The present disclosure relates generally to communication systems, and more particularly, to a wireless backhaul network.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

A hierarchical telecommunications network may have a hierarchical cell structure in which a larger cell (e.g., a macro cell) may be rearranged to include small cells (e.g., micro cells or pico cells). A micro/pico cell is allocated the radio spectrum to serve the increased population. In a hierarchical telecommunications network, the backhaul portion of the network includes the intermediate links between the core network, or backbone network and the small subnetworks at the "edge" of the entire hierarchical network. Reducing the cost of the backhaul network and increasing the flexibility of the backhaul network may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Using cellular radio access technologies (RATs) such as millimeter wave (mmW) for backhauling purposes may allow access points (APs) to self-backhaul access traffic to a suitable high-capacity fiber point and permit resource-efficient spectrum utilization. In this disclosure, a solution to enable synchronization and establishing links among the APs using available RATs with minimum modifications is provided.

In an aspect of the disclosure, a method, a computer-readable medium, and an apparatus for wireless communication are provided. The apparatus may be a base station. The apparatus may determine a first set of resources to be used for establishing network access for a set of UEs. The apparatus may determine a second set of resources for establishing backhaul links with a set of base stations. A resource schedule of the apparatus may include the first set of resources and the second set of resources.

In another aspect of the disclosure, a method, a computer-readable medium, and an apparatus for wireless communication are provided. The apparatus may be a first base station. The first base station may receive a set of reports from a set of base stations. The first base station may determine a resource schedule for a second base station within the set of base stations based on the set of reports. The first base station may transmit the resource schedule to the second base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
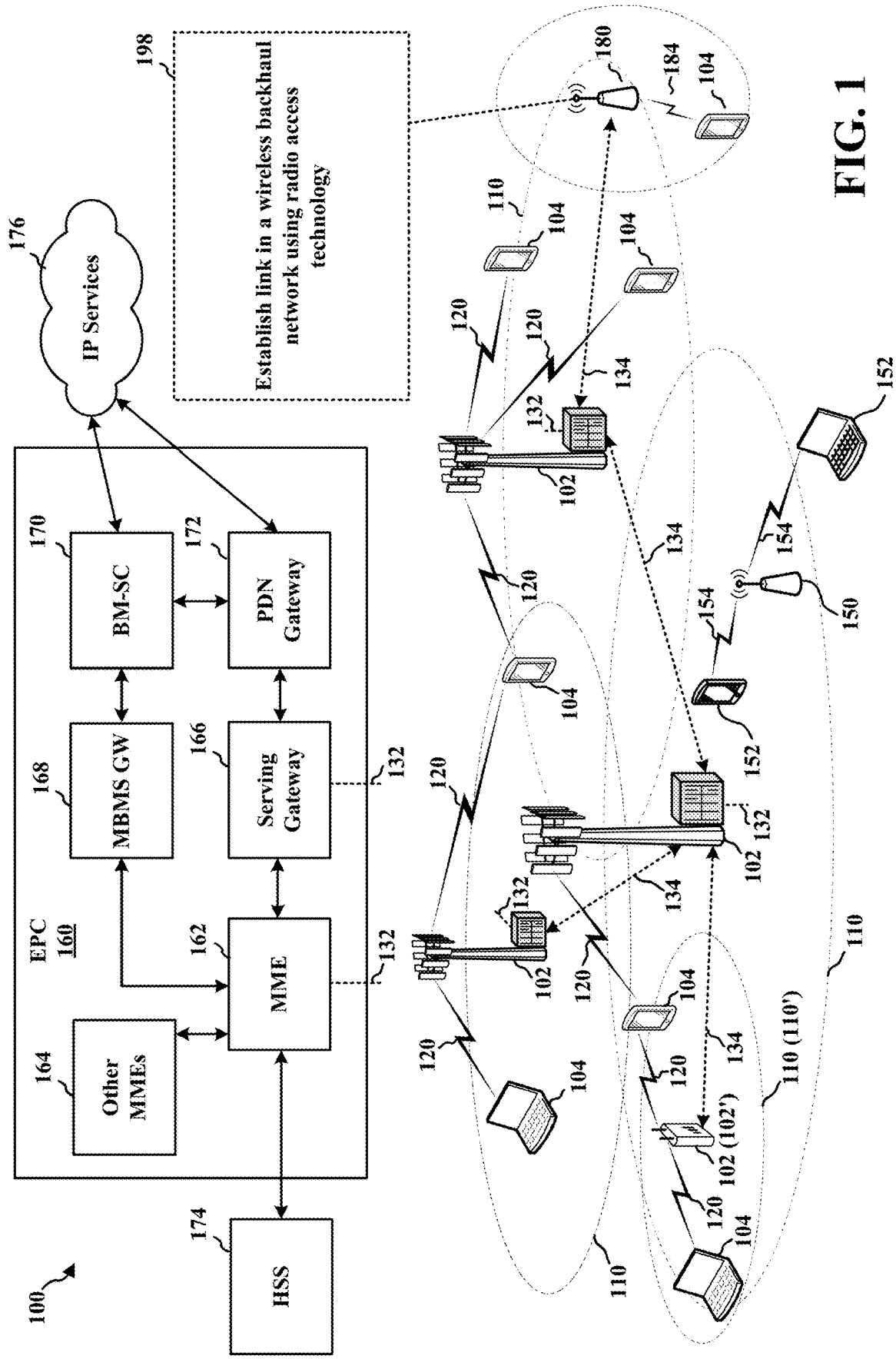
FIG. 1 is a diagram illustrating an example of a wireless communications system and an access network.
Figure 2:
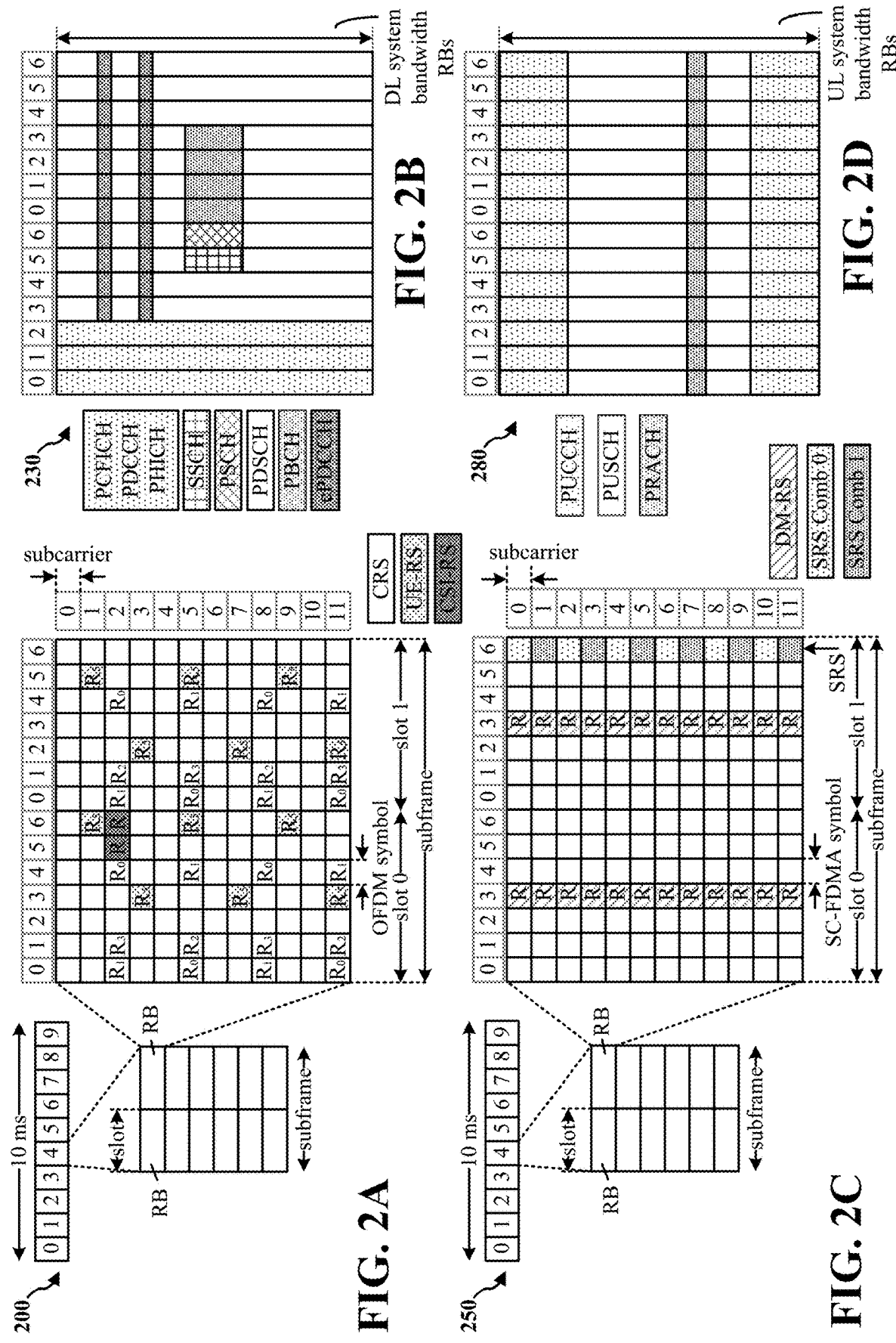
FIGS. 2A, 2B, 2C, and 2D are diagrams illustrating LTE examples of a DL frame structure, DL channels within the DL frame structure, an UL frame structure, and UL channels within the UL frame structure, respectively.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the mmW base station 180 may be configured to establish (198) link in a wireless backhaul network using radio access technology. The operations performed at 198 will be described below in detail with reference to FIGS. 2-10.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
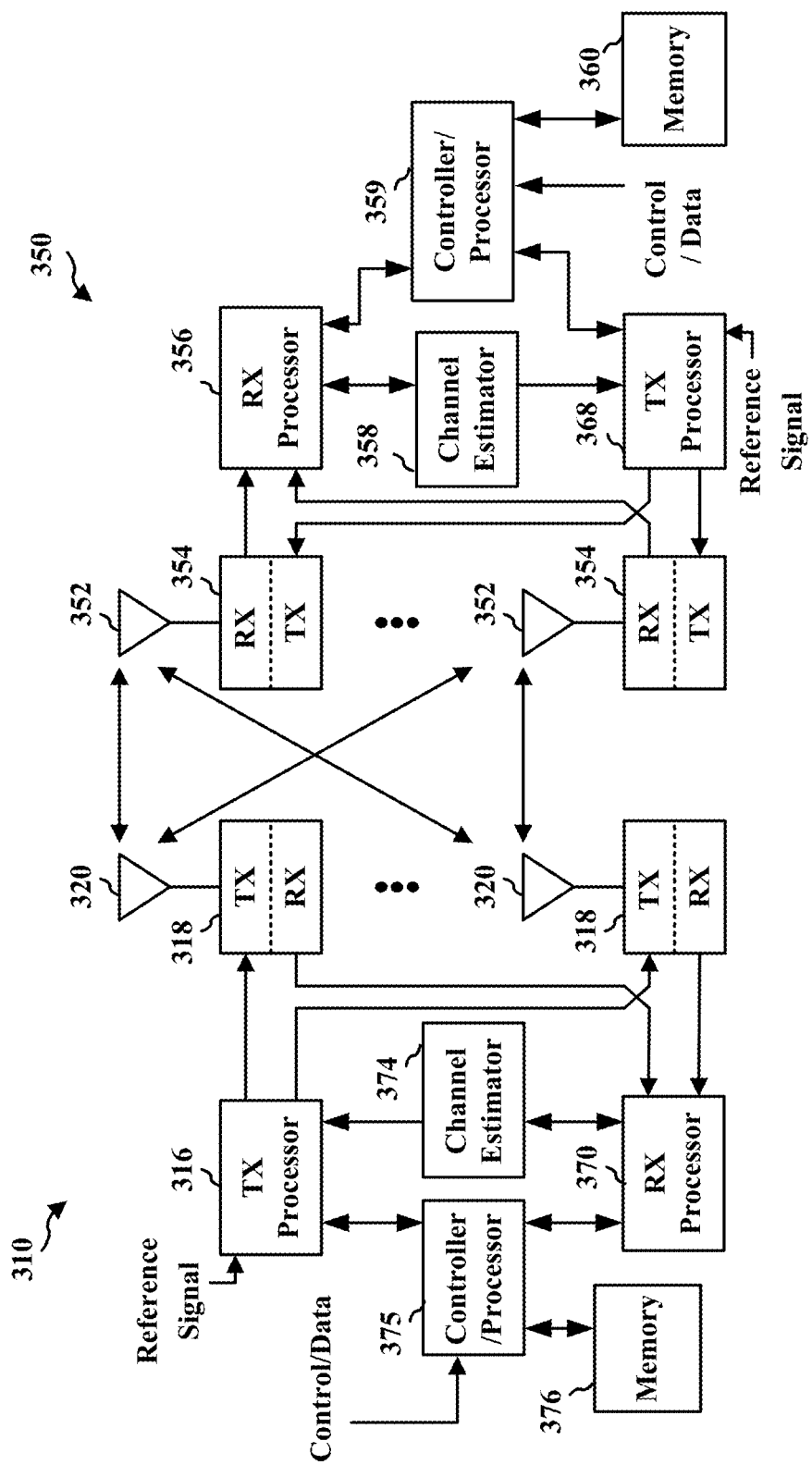
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Cellular technologies such as mmW may be used to support access traffic between UE and AP as well as for backhauling of access traffic among APs. It may be further possible that access and backhauling share the same resources, which may be referred to as an Integrated Access/Backhaul (IAB) solution. The sharing of the same wireless channel by both the access traffic and the backhauling of access traffic may be referred to as self-backhauling.

Such self-backhauling or IAB solutions may be promising with the evolution of cellular technologies due to the enhancements in wireless link capacity and reduction in latency. Further, self-backhauling may reduce the cost of dense small cells deployments.

Figure 4B:
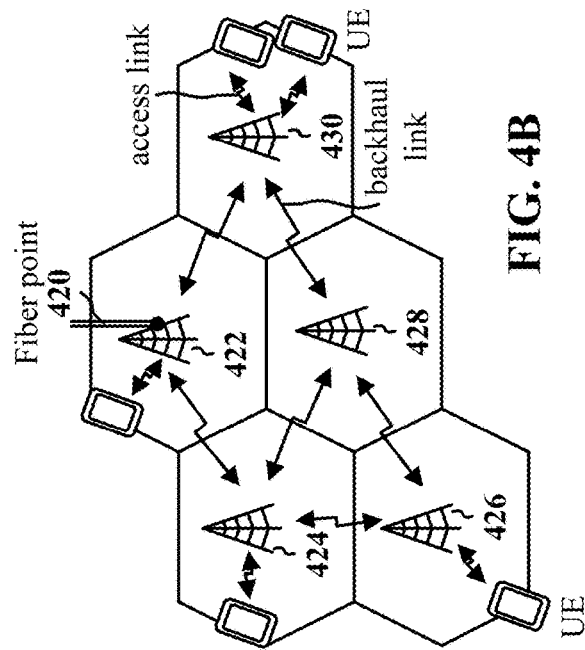
FIG. 4B shows another example of a wireless access network which supports access to UEs.
Figure 4C:
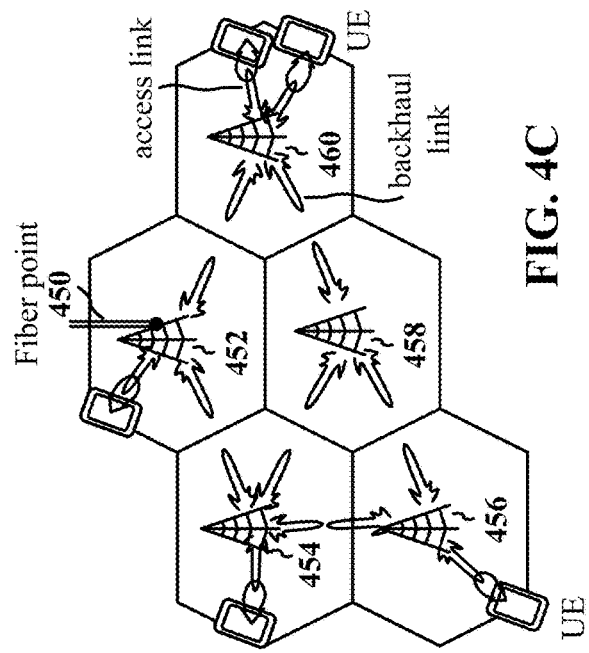
FIG. 4C illustrates an example of narrow pencil beams being used for access links and backhaul links.
Figure 4A:
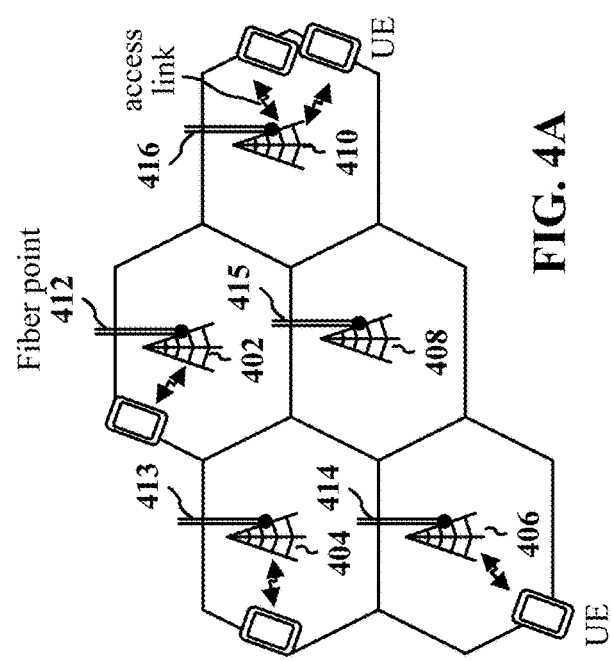
FIG. 4A shows an example of a wireless access network which supports access to UEs.

FIG. 4A shows an example of a wireless access network which supports access to UEs. In this example, each AP (e.g., the AP 402, 404, 406, 408, or 410) may be connected/coupled to a fiber point (e.g., the fiber point 412, 413, 414, 415, 416, respectively) to backhaul access traffic via the fiber point. Thus, there may be one fiber point per AP and there may be no wireless backhaul network between the APs.

FIG. 4B shows another example of a wireless access network which supports access to UEs. In this example, one fiber point 420 is provisioned. For example, the AP 422 may be connected directly to the fiber point 420 to backhaul access traffic, while access traffic of APs 424, 426, 428, and 430 may be exchanged with the fiber point 420 via a wireless backhaul network established among the APs (e.g., APs 422, 424, 426, 428, and 430).

Self-backhauling may be especially promising when using mmW-based radio technologies which apply very narrow antenna beams to reduce inter-link interference. Further, dynamic beam-steering and beam-search capabilities may be used to support discovery, link establishment and refinement in the presence of dynamic shadowing and Rayleigh fading.

FIG. 4C illustrates an example of narrow pencil beams being used for access links and backhaul links. In this example, one fiber point 450 is provisioned. For example, the AP 452 may be connected/coupled directly to the fiber point 450 to backhaul access traffic via the fiber point 450 (e.g., to the core network or backbone network), while access traffic of APs 454, 456, 458, and 460 may be exchanged with the fiber point 450 via a wireless backhaul network established among the APs (e.g., the APs 452, 454, 456, 458, and 460). Since APs may have larger antenna arrays compared to the UEs, the pencil beams of the APs may be narrower.

One of the main challenges of creating the wireless backhaul network for carrying access traffic of APs without a fiber point and coordinating the resources among the APs may be the half-duplexing constraint, i.e., an AP cannot receive and transmit at the same time in the same frequency band. Coordinating timing of transmission and reception may be possible via time synchronizing all links and imposing a frame structure as it is supported by cellular RATs.

In cellular RATs, a UE may establish a link to an AP by performing synchronization to align the UE's time and frequency with the AP and acquire system and AP information. To establish a link to an AP, the UE may further transmit a random access channel (RACH) preamble to the AP to inform the AP about the UE's presence and request resources for further communications. In a mmW system, the UE and the AP may need to find the best beam pair (e.g., the beam pair with the best transmission quality and/or the least interference) for transmissions/receptions between the UE and the AP. The transmission and reception of synchronization signals and RACH signals may allow the best beam pair to be identified. In addition, a new reference signal (e.g., a beam reference signal (BRS)) may be used to facilitate the beam searching task.

In a wireless backhaul network, APs may need to perform similar tasks to establish backhaul links with each other. It may be desirable to reuse the access network design and resources as much as possible with minimum disturbance to the access network performance. In what follows, an example is provided on how the access network (downlink) synchronization design may be utilized to enable synchronization among APs.

Figure 5:
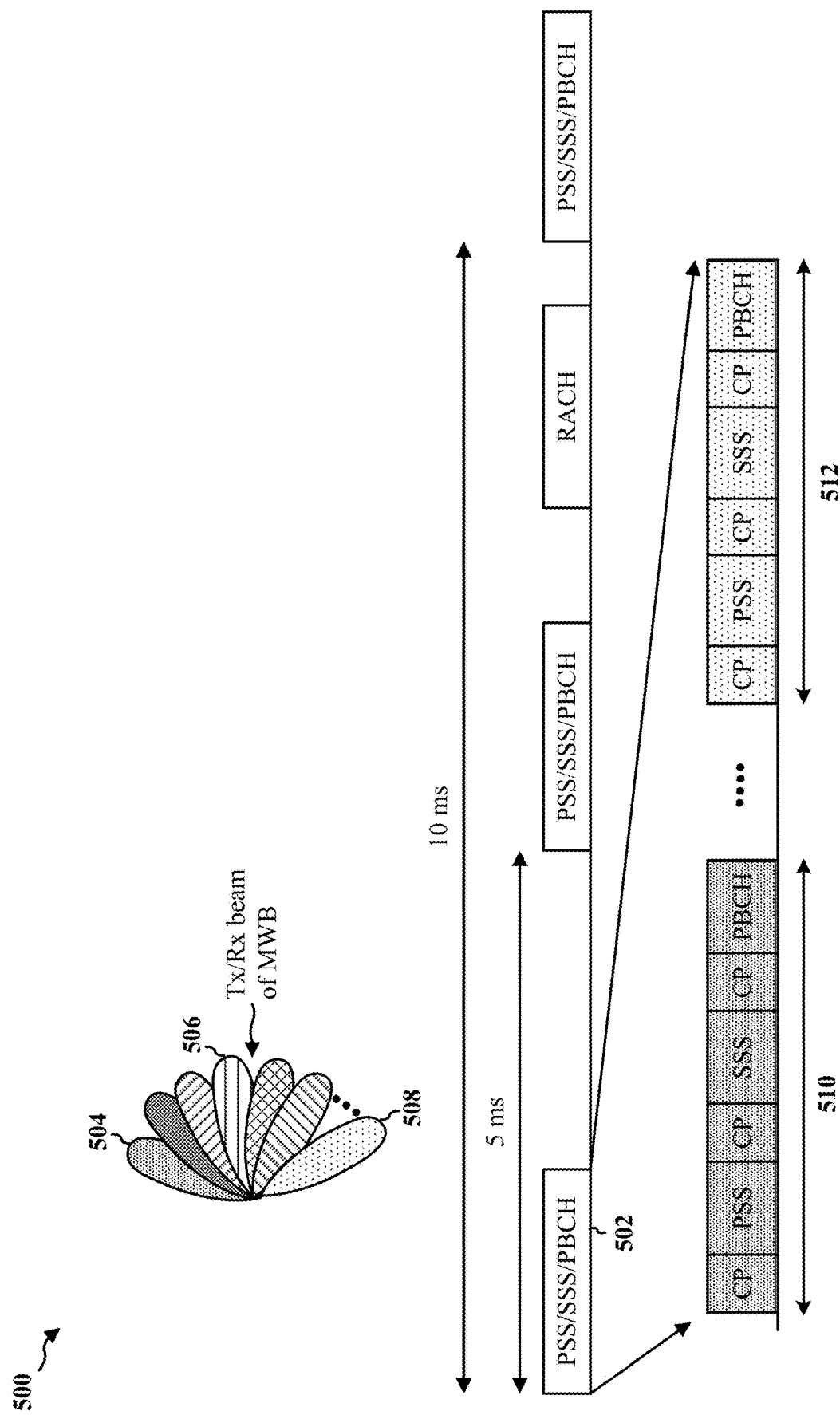
FIG. 5 is a diagram illustrating an example of resource allocation in a mmW system.

FIG. 5 is a diagram 500 illustrating an example of resource allocation in a mmW system. In the access network, a number of resources may be periodically allocated for the downlink synchronization. For example, there may be 1 synchronization subframe (e.g., 502) every 5 ms. During each synchronization subframe, all the eNBs (APs) may transmit one or more of a primary synchronization signal (PSS), an extended synchronization signal (ESS), a secondary synchronization signal (SSS), a PBCH, or a BRS. In a mmW system, the signals described above may be transmitted multiple times (e.g., starting with iteration 510 and ending with iteration 512, with several iterations in between) with different beam directions during a synchronization subframe to allow the UEs to find the best TX/RX beams for communication with the eNBs. In FIG. 5, each TX/RX beam directions (e.g., 504, 506, . . . 508) of mmW band is illustrated with a different pattern. For example, during iteration 510, the signals may be transmitted with beam direction 504, and during iteration 512, the signals may be transmitted with beam direction 506.

Figure 6:
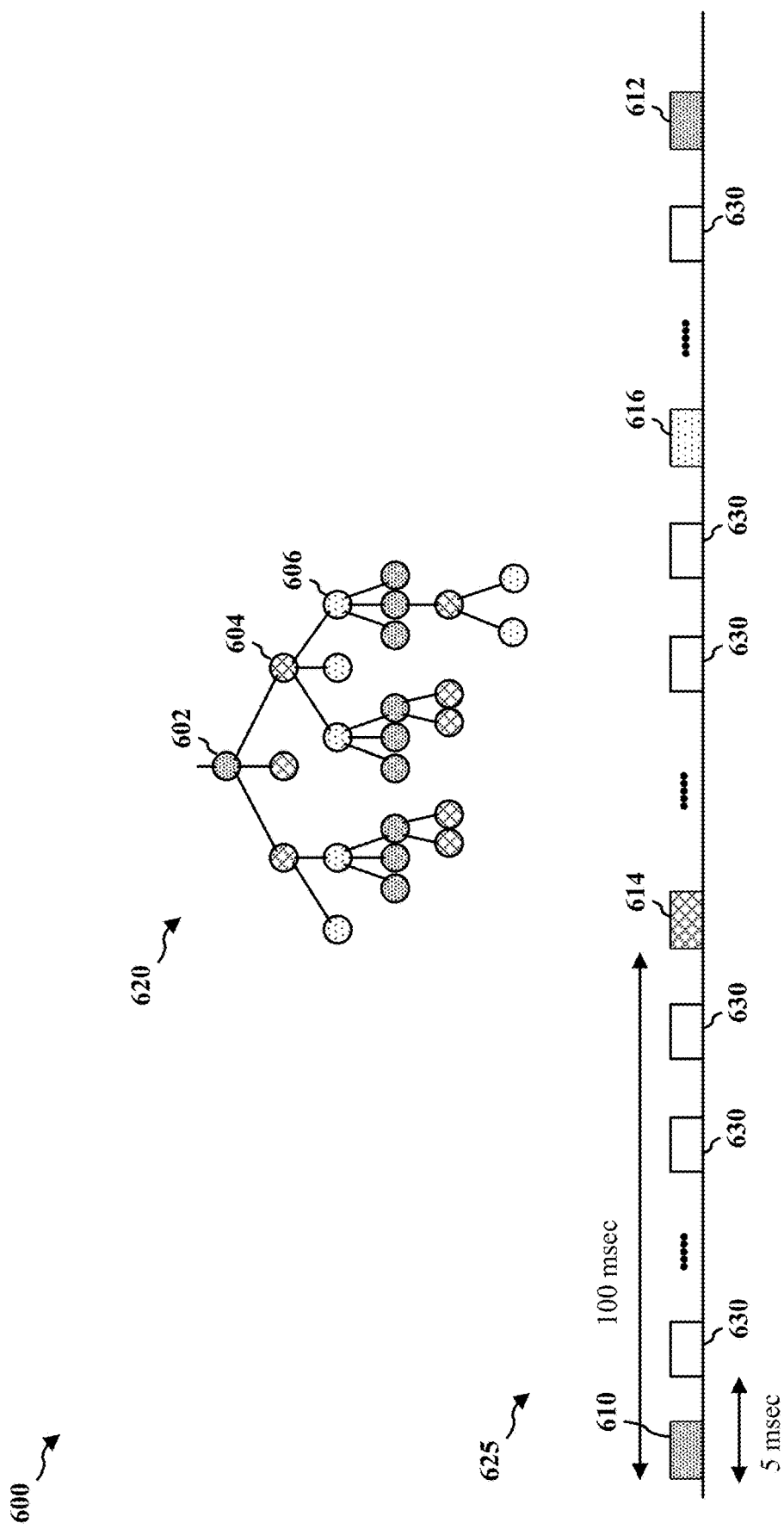
FIG. 6 is a diagram illustrating an example of using a color-code to determine when to switching from transmitting to listening to synchronization signals for each AP.

In one configuration, an AP may be allowed to stop transmitting during a subset of synchronization resources and instead listen to the incoming signals and try to synchronize to the AP's neighboring APs, thus overcoming the half-duplex constraint. FIG. 6 is a diagram 600 illustrating an example of using a color-code to determine when to switch from transmitting (e.g., synchronization signals to other APs) to listening to synchronization signals from each AP. The diagram 600 includes a tree 620 illustrating a network of APs and a subframe diagram 625 illustrating resource allocation for different subframes. In one configuration, two APs may be assigned two different colors if the two APs are directly linked in the tree 620. A subframe in the subframe diagram 625 may be assigned a color to indicate that the AP assigned with the same color may be switching from transmission to listening to synchronization signals during the subframe.

In the tree 620, each of the APs is assigned one of 3 colors. Each AP decides when to ditch the AP's synchronization transmission based on the color assigned to the AP. For example, the AP 602 may be assigned a first color (illustrated with a first pattern). As a result, the AP 602 may switch from transmission to listening to synchronization signals during the subframes 610 and 612, which are assigned the first color. Similarly, the AP 604 may be assigned a second color (illustrated with a second pattern) and may switch from transmission to listening to synchronization signals during the subframe 614, which is assigned the second color. The AP 606 may be assigned a third color (illustrated with a third pattern) and may switch from transmission to listening to synchronization signals during the subframe 616, which is assigned the third color.

In one configuration, the available synchronization resources (e.g., subframes) may be divided into two sets of resources: a first set of resources and a second set of resources. During the first set of resources (e.g., the subframes 630), the synchronization transmission may follow the downlink synchronization design (e.g., all APs transmit synchronization signals). During the second set of resources (e.g., the subframes 610, 612, 614, 616), an AP may be in any of the following states for backhaul synchronization: 1) RX mode—synchronization reception from other APs; 2) TX mode—synchronization transmission with a potentially modified configuration; or 3) hybrid mode—switching between RX and TX mode during a single subframe. In one configuration, an AP may be in any of, or switch between, multiple states (e.g., RX mode, TX mode, hybrid mode) within the second set of resources. For example, in a subset of the second set of resources, the AP may be in RX mode; and in another subset of the second set of resources, the AP may be in TX mode, and so on.

In one configuration, the downlink synchronization may be reused as much as possible to reduce the negative effect (e.g., performance reduction) on the UEs. In such a configuration, each AP may modify the AP's synchronization transmission configuration in a subset of resources to increase the backhaul synchronization. For example, the APs may change the set of beams used for synchronization transmission by changing the elevation angle and/or the azimuth angles. In another example, the APs may change the signal waveforms or the resources used for the transmissions (e.g. transmitting synchronization signals in a wider bandwidth). In one configuration, the modified configuration for synchronization transmission may include any combination of: 1) a modified set of beams to be swept during the synchronization transmission (e.g., elevation angle may be modified towards other APs, and/or the set of azimuth angles to be swept may be different from the azimuth angles used for downlink synchronization transmission); 2) modified constituent signals (e.g., PSS/SSS/ESS/PBCH) design and modified information carried by the constituent signals; or 3) modified resources allocated for the transmission (e.g., synchronization signals may be transmitted over a wider bandwidth).

In one configuration, each AP in a wireless backhaul network may transmit some information to inform other APs and UEs about the synchronization schedule of the AP. For example, an AP may transmit 1-bit of information to inform other APs whether the AP is participating in backhaul synchronization. In case the AP follows a semi-persistent schedule for synchronization TX/RX, the AP may transmit some information (e.g., a few bits of information) from which the schedule can be inferred/identified (e.g. via an index to a preconfigured list of schedules). In one configuration, the index to a preconfigured list of schedules may be in the form a hop-count or a color-code. In one configuration, the information from which the schedule can be inferred may be a random seed used to generate a schedule pattern. In a more dynamic situation, where the AP changes its schedule, the AP may transmit some information (e.g., a few bits of information) to indicate the changes to the schedule and specify the future state(s) of the AP. In one configuration, the information to inform other APs and UEs about the synchronization schedule of the AP may be sent in any combination of MIB, SIB, RRC message.

In one configuration, an AP may decide the schedule of the AP (e.g., sequence of synchronization states of the AP) based on different factors. For example, the schedule of the AP may be determined based on the information received form all or a subset of neighboring APs. In one configuration, the schedule of the AP may be determined based on the random seed used by the other APs and/or the hop-count or color-code used by the other APs. In one configuration, the schedule of the AP may be determined based on some preconfigured system parameters, and/or some network configuration coming from upper layers, and/or a random seed. In one configuration, an AP may change the schedule of the AP at any time based on the information received from all or a subset of other APs and/or some network configurations coming from upper layers.

In one configuration, in order to manage the synchronization schedules, a number of "network configuration nodes" may be defined in the wireless backhaul network. The role of the network configuration nodes may be to receive information from the APs, determine the synchronization schedules of the APs, and inform the APs about the synchronization schedules. In one configuration, the APs may report some information to the network configuration nodes. The reported information from an AP may include measurements and information the AP received from neighboring APs and UEs. The network configuration nodes may determine the synchronization schedule for all (or a subset) of APs based on all the information the network configuration nodes received and transmit the synchronization schedule back to the APs. Therefore, APs may determine or modify their synchronization schedule based on the message(s) from one or more network configuration nodes.

Although the disclosure above focuses on the synchronization aspects of the link establishment procedure, similar approach may be applied to the RACH TX/RX process and BRS TX/RX process (e.g., where BRS is not part of the synchronization subframe).

Figure 7:
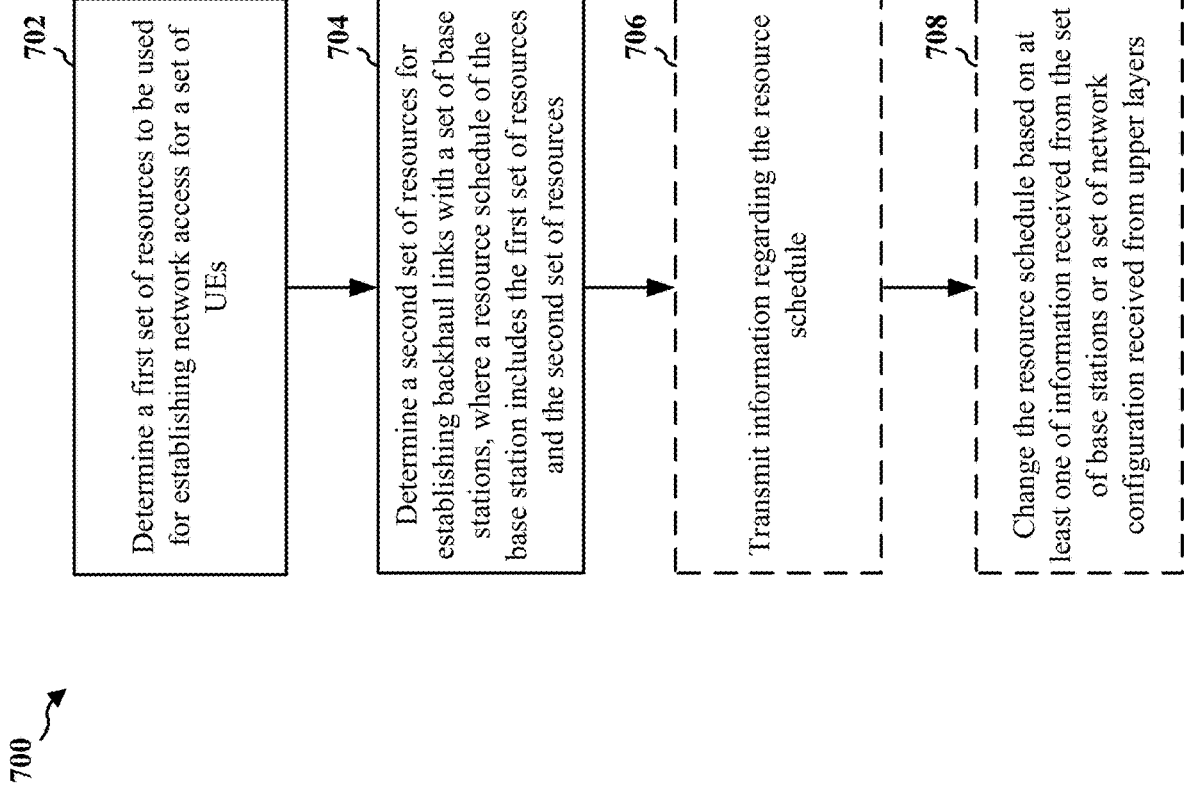
FIG. 7 is a flowchart of a method of wireless communication.

FIG. 7 is a flowchart 700 of a method of wireless communication. The method may be performed by an mmW base station (e.g., the mmW base station 180, 310, 452, 454, 456, 458, 460, 602, 604, 606, or the apparatus 902/902'). At 702, the base station may determine a first set of resources to be used for establishing network access for a set of UEs.

At 704, the base station may determine a second set of resources for establishing backhaul links with a set of base stations. A resource schedule of the base station may include the first set of resources and the second set of resources. In one configuration, the resource schedule may be determined based on one or more of information received from the set of base stations, a set of preconfigured system parameters, a set of network configuration received from upper layers, or a random seed.

For example, the resource schedule may be determined based on the information received from other base stations to ensure the synchronization signals from other base stations can be heard. In one configuration, the information received from other base stations may include the color-codes used by the other base stations, and the base station may select a different color-code in determining the resource schedule.

The resource schedule may be determined based on some preconfigured system parameters. For example, the base station may be initially configured to stop transmitting synchronization signal on a set of resources. In one configuration, the set of resources may be preconfigured. In one configuration, the set of resources may depend in part on the cell ID of the base station.

In one configuration, the upper layers of the base station may determine the resource schedule. For example, the resource schedule may be determined based on some measurements of the state of the base station performed by the upper layers. Similarly, the resource schedule may be determined based on a random seed.

In one configuration, the first set of resources may be a first set of synchronization resources and the second set of resources may be a second set of synchronization resources. The base station may transmit synchronization signals during each of the first set of synchronization resources. In one configuration, during the second set of synchronization resources, the base station may perform one or more of receiving synchronization signals, switching between receiving and sending synchronization signals during a resource of the second set of synchronization resources, or sending synchronization signal with a modified configuration. In one configuration, the modified configuration may include one or more of a modified set of beams to be swept during synchronization transmission, a modified design of constituent signals and information carried by the constituent signals, or modified resources allocated for the synchronization transmission. In one configuration, the modified set of beams may include one or more of a modified elevation angle or a modified set of azimuth angles to be swept. In one configuration, the constituent signals may include one or more of PSS, SSS, ESS, or PBCH. In one configuration, the modified resources may include a wider bandwidth than a bandwidth for transmitting synchronization signals to the set of UEs.

In one configuration, the first set of resources may be a first set of RACH resources and the second set of resources may be a second set of RACH resources. The base station may receive RACH preamble during each of the first set of RACH resources. In one configuration, during the second set of RACH resources, the base station may perform one or more of sending RACH preamble, switching between receiving and sending RACH preamble during a resource of the second set of RACH resources, or sending and/or receiving RACH preamble with a modified configuration. In one configuration, the modified configuration may include one or more of a modified set of beams to be swept during RACH transmission/reception or modified resources allocated for the RACH transmission/reception. In one configuration, the modified set of beams may include one or more of a modified elevation angle or a modified set of azimuth angles to be swept. In one configuration, the modified resources may include a wider bandwidth than a bandwidth for transmitting RACH preamble by the set of UEs In one configuration, the first set of resources may be a first set of beam reference signal (BRS) resources and the second set of resources may be a second set of BRS resources. In one configuration, the base station may transmit BRS during each of the first set of BRS resources. In one configuration, during the second set of BRS resources, the base station may perform one or more of receiving BRS, switching between receiving and sending BRS during a resource of the second set of BRS resources, or sending BRS with a modified configuration. In one configuration, the modified configuration may include one or more of a modified set of beams to be swept during BRS transmission or modified resources allocated for the BRS transmission. In one configuration, the modified set of beams may include one or more of a modified elevation angle or a modified set of azimuth angles to be swept. In one configuration, the modified resources may include a wider bandwidth than a bandwidth for transmitting BRS to the set of UEs.

At 706, the base station may optionally transmit information regarding the resource schedule. In one configuration, the information regarding the resource schedule may include one or more of a single bit to indicate that the base station participates in a backhaul network, a first set of bits to indicate the resource schedule, or a second set of bits to indicate changes in the resource schedule and a future state of the resource schedule. In one configuration, the first set of bits may include a random seed or an index to a preconfigured list of resource schedules. In one configuration, the index may include a hop-count or a color-code. In one configuration, the information regarding the resource schedule may be carried in one or more of a MIB, a SIB, or a RRC message.

At 708, the base station may optionally change the resource schedule based on at least one of information received from the set of base stations or a set of network configuration received from upper layers.

Figure 8:
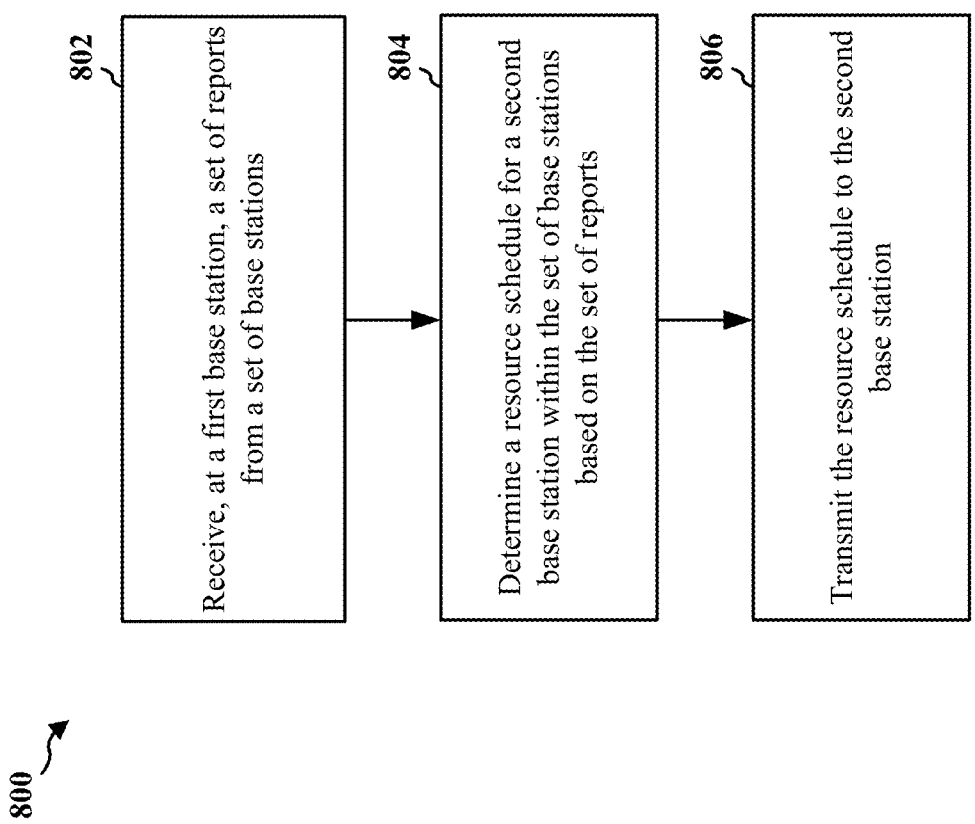
FIG. 8 is a flowchart of a method of wireless communication.

FIG. 8 is a flowchart 800 of a method of wireless communication. The method may be performed by a network configuration node. In one configuration, the network configuration node may be an mmW base station (e.g., the mmW base station 180, 310, 452, 454, 456, 458, 460, 602, 604, 606, or the apparatus 902/902'). In one configuration, the network configuration node may be a first base station. At 802, the first base station may receive a set of reports from a set of base stations. In one configuration, a report of the set of reports received from a third base station within the set of base stations may include one or more of a single bit to indicate that the third base station participates in a backhaul network, a first set of bits to indicate a resource schedule of the third base station, or a second set of bits to indicate changes in the resource schedule of the third base station and a future state of the resource schedule of the third base station. In one configuration, a report of the set of reports received from a third base station within the set of base stations may include measurements and information the third base station received from neighboring base stations and UEs.

At 804, the first base station may determine a resource schedule for a second base station within the set of base stations based on the set of reports. In one configuration, the resource schedule may be further determined based on one or more of a set of preconfigured system parameters, a set of network configuration received from upper layers, or a random seed.

For example, the resource schedule may be determined based on the set of reports to ensure the synchronization signals from other base stations can be heard by the second base station. In one configuration, the set of reports may include the color-codes used by the other base stations, and the first base station may select a different color-code in determining the resource schedule for the second base station.

The resource schedule may be determined based on some preconfigured system parameters. For example, the second base station may be initially configured to stop transmitting synchronization signal on a set of resources. In one configuration, the set of resources may be preconfigured. In one configuration, the set of resources may depend in part on the cell ID of the second base station.

In one configuration, the upper layers may determine the resource schedule. For example, the resource schedule may be determined based on some measurements of the state of the second base station performed by the upper layers. Similarly, the resource schedule may be determined based on a random seed.

The first base station may potentially have more information about the system through receiving reports from multiple base stations. The first station may process the set of reports and come up with a resource schedule for each of the set of base stations to allow efficient utilization of the resources in the system while providing good performance for the UEs and base stations. For example, the first base station may select different random seeds for the set of base stations to assure the set of base stations can hear each other's synchronization transmission.

In one configuration, the resource schedule may include a first set of resources to be used for establishing network access for a set of UEs via the second base station and a second set of resources for establishing backhaul links for the second base station. In one configuration, the first set of resources may be a first set of synchronization resources and the second set of resources may be a second set of synchronization resources. In one configuration, the first set of resources may be a first set of RACH resources and the second set of resources may be a second set of RACH resources. In one configuration, the first set of resources may be a first set of BRS resources and the second set of resources may be a second set of BRS resources.

At 806, the first base station may transmit the resource schedule to the second base station. The second base station may perform synchronization based on the resource schedule.

Figure 9:
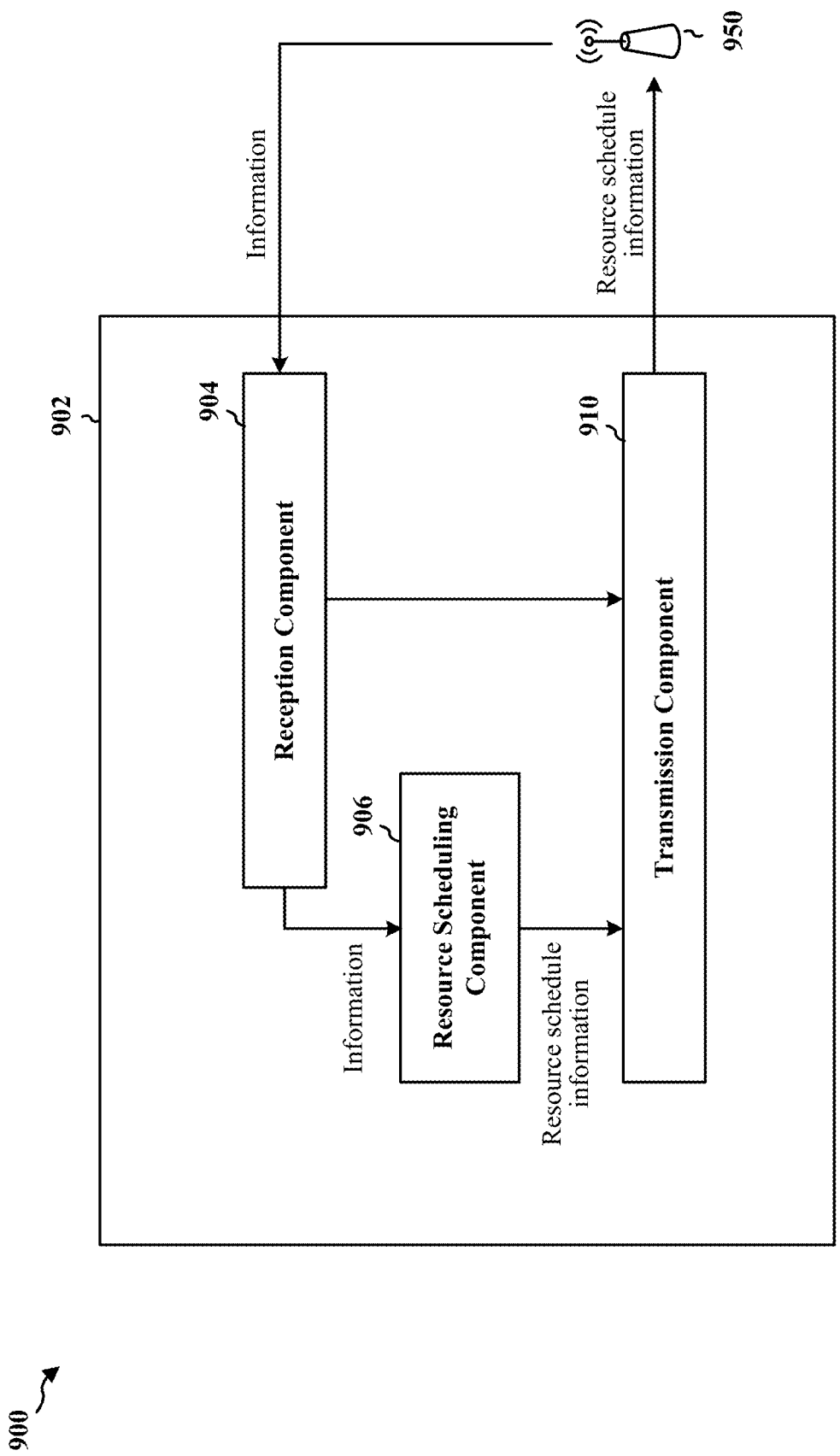
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be an eNB. The apparatus 902 may include a reception component 904 that receives information from a base station 950. In one configuration, the reception component 904 may perform operations described above with reference to 802 in FIG. 8.

The apparatus 902 may include a transmission component 910 that transmits resource schedule or information regarding resource schedule to the base station 950. In one configuration, the transmission component 910 may perform operations described above with reference to 706 in FIG. 7 or 806 in FIG. 8. The reception component 904 and the transmission component 910 may cooperate to coordinate the communication of the apparatus 902.

The apparatus 902 may include a resource scheduling component 906 that determines resource schedule based on information received from the reception component 904 and send the determined resource schedule or information regarding the determined resource schedule to the transmission component 910. In one configuration, the resource scheduling component 906 may perform operations described above with reference to 702, 704, or 708 in FIG. 7, or 804 in FIG. 8.

The apparatus may include additional components that perform each of the blocks of the algorithm in the aforementioned flowcharts of FIGS. 7 and 8. As such, each block in the aforementioned flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
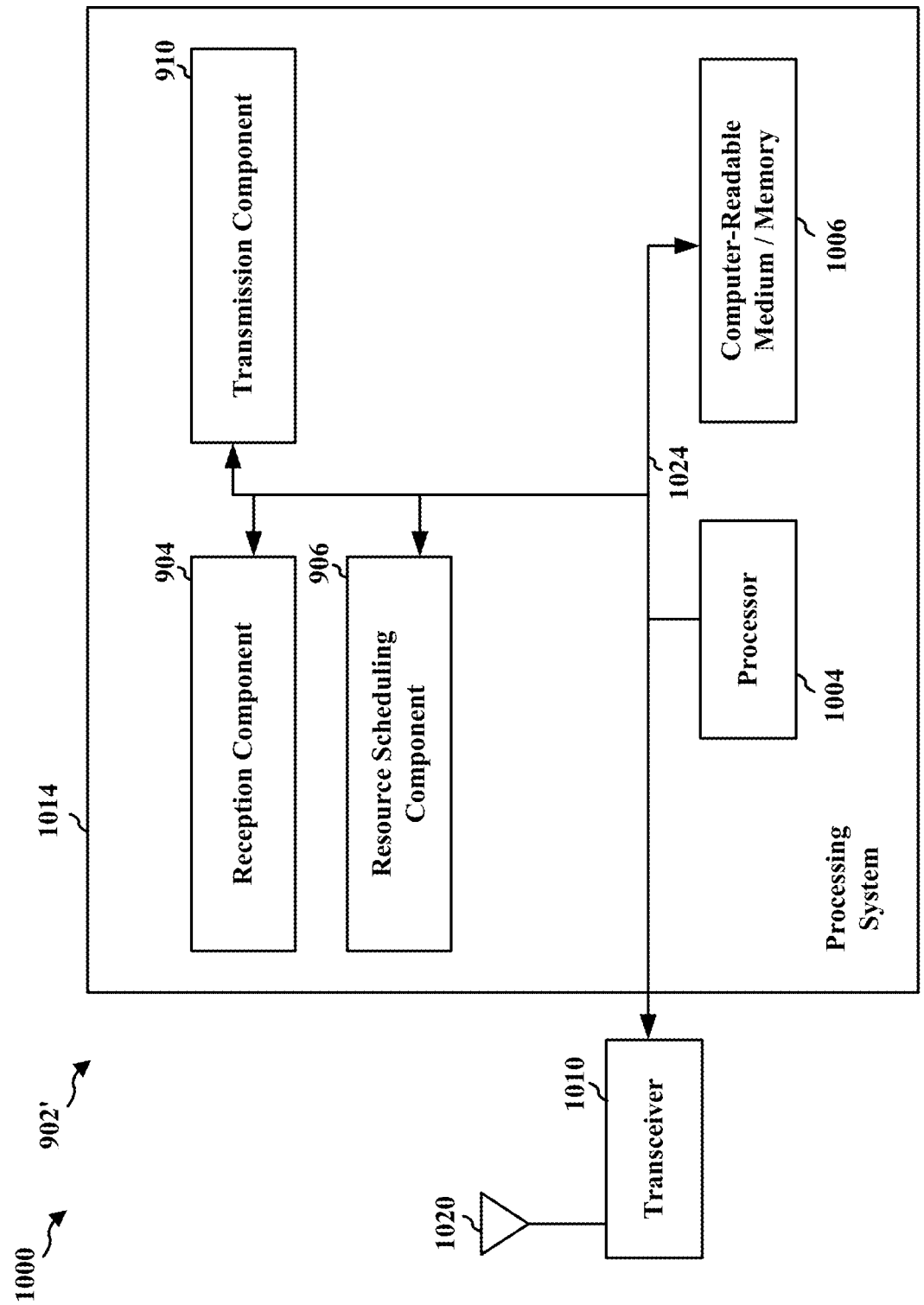
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 910, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 910, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 910. The components may be software components running in the processor 1004, resident/stored in the computer readable medium/memory 1006, one or more hardware components coupled to the processor 1004, or some combination thereof. The processing system 1014 may be a component of the eNB 310 and may include the memory 376 and/or at least one of the TX processor 316, the RX processor 370, and the controller/processor 375.

In one configuration, the apparatus 902/902' for wireless communication may include means for determining a first set of resources to be used for establishing network access for a set of UEs. In one configuration, the means for determining a first set of resources may perform operations described above with regard to 702 in FIG. 7. In one configuration, the means for determining a first set of resources may include the resource scheduling component 906 and/or the processor 1004.

In one configuration, the apparatus 902/902' may include means for determining a second set of resources for establishing backhaul links with a set of base stations. In one configuration, the means for determining a second set of resources may perform operations described above with regard to 704 in FIG. 7. In one configuration, the means for determining a second set of resources may include the resource scheduling component 906 and/or the processor 1004.

In one configuration, the apparatus 902/902' may include means for transmitting information regarding the resource schedule. In one configuration, the means for transmitting information regarding the resource schedule may perform operations described above with regard to 706 in FIG. 7. In one configuration, the means for transmitting information regarding the resource schedule may include the transceiver 1010, the one or more antennas 1020, the transmission component 910, and/or the processor 1004.

In one configuration, the apparatus 902/902' may include means for changing the resource schedule based on at least one of information received from the set of base stations or a set of network configuration received from upper layers. In one configuration, the means for changing the resource schedule may perform operations described above with regard to 708 in FIG. 7. In one configuration, the means for changing the resource schedule may include the resource scheduling component 906 and/or the processor 1004.

In one configuration, the apparatus 902/902' may include means for receiving a set of reports from a set of base stations. In one configuration, the means for receiving a set of reports may perform operations described above with regard to 802 in FIG. 8. In one configuration, the means for receiving a set of reports may include the transceiver 1010, the one or more antennas 1020, the reception component 904, and/or the processor 1004.

In one configuration, the apparatus 902/902' may include means for determining a resource schedule for a second base station within the set of base stations based on the set of reports. In one configuration, the means for determining a resource schedule for a second base station may perform operations described above with regard to 804 in FIG. 8. In one configuration, the means for determining a resource schedule for a second base station may include the resource scheduling component 906 and/or the processor 1004.

In one configuration, the apparatus 902/902' may include means for transmitting the resource schedule to the second base station. In one configuration, the means for transmitting the resource schedule to the second base station may perform operations described above with regard to 806 in FIG. 8. In one configuration, the means for transmitting the resource schedule to the second base station may include the transceiver 1010, the one or more antennas 1020, the transmission component 910, and/or the processor 1004.

The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a base station, comprising:
   determining a first set of resources to be used for establishing network access for a set of user equipments (UEs); and
   determining a second set of resources for establishing backhaul links with a set of base stations, wherein a resource schedule of the base station comprises the first set of resources and the second set of resources, wherein the first set of resources is a first set of beam reference signal (BRS) resources and the second set of resources is a second set of BRS resources,
   wherein the base station transmits BRS during each of the first set of BRS resources,
   wherein, during the second set of BRS resources, the base station performs one or more of switching between receiving and sending BRS during a resource of the second set of BRS resources, or sending BRS with a modified configuration,
   wherein the modified configuration comprises one or more of a modified set of beams to be swept during BRS transmission or modified resources allocated for the BRS transmission.

2. The method of claim 1, wherein the first set of resources is a first set of synchronization resources and the second set of resources is a second set of synchronization resources,
   wherein the base station transmits synchronization signals during each of the first set of synchronization resources,
   wherein, during the second set of synchronization resources, the base station performs one or more of receiving synchronization signals, switching between receiving and sending synchronization signals during a resource of the second set of synchronization resources, or sending synchronization signals with a modified configuration.

3. The method of claim 2, wherein the modified configuration comprises one or more of a modified set of beams to be swept during synchronization transmission, a modified design of constituent signals and information carried by the constituent signals, or modified resources allocated for the synchronization transmission,
   wherein the modified set of beams comprises one or more of a modified elevation angle or a modified set of azimuth angles to be swept,
   wherein the constituent signals comprise one or more of primary synchronization signal (PSS), secondary synchronization signal (SSS), extended synchronization signal (ESS), or Physical Broadcast Channel (PBCH),
   wherein the modified resources comprise a wider bandwidth than a bandwidth for transmitting synchronization signals to the set of UEs.

4. The method of claim 1, further comprising transmitting information regarding the resource schedule, wherein the information regarding the resource schedule is carried in one or more of a master information block (MIB), a system information block (SIB), or a radio resource control (RRC) message.

5. The method of claim 4, wherein the information regarding the resource schedule comprises one or more of a single bit to indicate that the base station participates in a backhaul network, a first set of bits to indicate the resource schedule, or a second set of bits to indicate changes in the resource schedule and a future state of the resource schedule,
   wherein the first set of bits comprises a random seed or an index to a preconfigured list of resource schedules,
   wherein the index comprises a hop-count or a color-code.

6. The method of claim 1, wherein the resource schedule is determined based on one or more of information received from the set of base stations, a set of preconfigured system parameters, a set of network configuration received from upper layers, or a random seed.

7. The method of claim 1, further comprising changing the resource schedule based on at least one of information received from the set of base stations or a set of network configuration received from upper layers.

8. The method of claim 1,
   wherein, during the second set of BRS resources, the base station is configured to receive BRS,
   wherein the modified set of beams comprises one or more of a modified elevation angle or a modified set of azimuth angles to be swept,
   wherein the modified resources comprise a wider bandwidth than a bandwidth for transmitting BRS to the set of UEs.

9. A method of wireless communication of a base station, comprising:
   determining a first set of resources to be used for establishing network access for a set of user equipments (UEs); and
   determining a second set of resources for establishing backhaul links with a set of base stations, wherein a resource schedule of the base station comprises the first set of resources and the second set of resources, wherein the first set of resources is a first set of beam reference signal (BRS) resources and the second set of resources is a second set of BRS resources,
   wherein the first set of resources is a first set of random access channel (RACH) resources and the second set of resources is a second set of RACH resources,
   wherein the base station receives RACH preamble during each of the first set of RACH resources,
   wherein, during the second set of RACH resources, the base station performs one or more of sending RACH preamble, switching between receiving and sending RACH preamble during a resource of the second set of RACH resources, or sending or receiving RACH preamble with a modified configuration,
   wherein the modified configuration comprises one or more of a modified set of beams to be swept during RACH transmission or reception, or modified resources allocated for the RACH transmission or reception,
   wherein the modified set of beams comprises one or more of a modified elevation angle or a modified set of azimuth angles to be swept,
   wherein the modified resources comprise a wider bandwidth than a bandwidth for transmitting RACH preamble by the set of UEs.

10. An apparatus for wireless communication, the apparatus being a base station, comprising:

a memory; and at least one processor coupled to the memory and configured to:

determine a first set of resources to be used for establishing network access for a set of user equipments (UEs); and determine a second set of resources for establishing backhaul links with a set of base stations, wherein a resource schedule of the base station comprises the first set of resources and the second set of resources, wherein the first set of resources is a first set of beam reference signal (BRS) resources and the second set of resources is a second set of BRS resources, wherein the base station transmits BRS during each of the first set of BRS resources, wherein, during the second set of BRS resources, the base station performs one or more of switching between receiving and sending BRS during a resource of the second set of BRS resources, or sending BRS with a modified configuration, wherein the modified configuration comprises one or more of a modified set of beams to be swept during BRS transmission or modified resources allocated for the BRS transmission.

11. The apparatus of claim 10, wherein the first set of resources is a first set of synchronization resources and the second set of resources is a second set of synchronization resources, wherein the base station transmits synchronization signals during each of the first set of synchronization resources, wherein, during the second set of synchronization resources, the base station performs one or more of receiving synchronization signals, switching between receiving and sending synchronization signals during a resource of the second set of synchronization resources, or sending synchronization signals with a modified configuration.

12. The apparatus of claim 11, wherein the modified configuration comprises one or more of a modified set of beams to be swept during synchronization transmission, a modified design of constituent signals and information carried by the constituent signals, or modified resources allocated for the synchronization transmission, wherein the modified set of beams comprises one or more of a modified elevation angle or a modified set of azimuth angles to be swept, wherein the constituent signals comprise one or more of primary synchronization signal (PSS), secondary synchronization signal (SSS), extended synchronization signal (ESS), or Physical Broadcast Channel (PBCH), wherein the modified resources comprise a wider bandwidth than a bandwidth for transmitting synchronization signals to the set of UEs.

13. The apparatus of claim 10, wherein the at least one processor is further configured to transmit information regarding the resource schedule, wherein the information regarding the resource schedule is carried in one or more of a master information block (MIB), a system information block (SIB), or a radio resource control (RRC) message.

14. The apparatus of claim 13, wherein the information regarding the resource schedule comprises one or more of a single bit to indicate that the base station participates in a backhaul network, a first set of bits to indicate the resource schedule, or a second set of bits to indicate changes in the resource schedule and a future state of the resource schedule, wherein the first set of bits comprises a random seed or an index to a preconfigured list of resource schedules, wherein the index comprises a hop-count or a color-code.

15. The apparatus of claim 10, wherein the resource schedule is determined based on one or more of information received from the set of base stations, a set of preconfigured system parameters, a set of network configuration received from upper layers, or a random seed.

16. The apparatus of claim 10, wherein the at least one processor is further configured to change the resource schedule based on at least one of information received from the set of base stations or a set of network configuration received from upper layers.

17. The apparatus of claim 10, wherein, during the second set of BRS resources, the base station is configured to receive BRS wherein the modified set of beams comprises one or more of a modified elevation angle or a modified set of azimuth angles to be swept, wherein the modified resources comprise a wider bandwidth than a bandwidth for transmitting BRS to the set of UEs.

18. An apparatus for wireless communication, the apparatus being a base station, comprising:

a memory; and at least one processor coupled to the memory and configured to:

determine a first set of resources to be used for establishing network access for a set of user equipments (UEs); and determine a second set of resources for establishing backhaul links with a set of base stations, wherein a resource schedule of the base station comprises the first set of resources and the second set of resources, wherein the first set of resources is a first set of random access channel (RACH) resources and the second set of resources is a second set of RACH resources, wherein the base station receives RACH preamble during each of the first set of RACH resources, wherein, during the second set of RACH resources, the base station performs one or more of sending RACH preamble, switching between receiving and sending RACH preamble during a resource of the second set of RACH resources, or sending or receiving RACH preamble with a modified configuration, wherein the modified configuration comprises one or more of a modified set of beams to be swept during RACH transmission or reception, or modified resources allocated for the RACH transmission or reception, wherein the modified set of beams comprises one or more of a modified elevation angle or a modified set of azimuth angles to be swept, wherein the modified resources comprise a wider bandwidth than a bandwidth for transmitting RACH preamble by the set of UEs.

* * * * *